Nov. 7, 1950     C. H. RIPATTE     2,529,187
CAVITY INSULATOR
Filed March 3, 1949     2 Sheets—Sheet 1
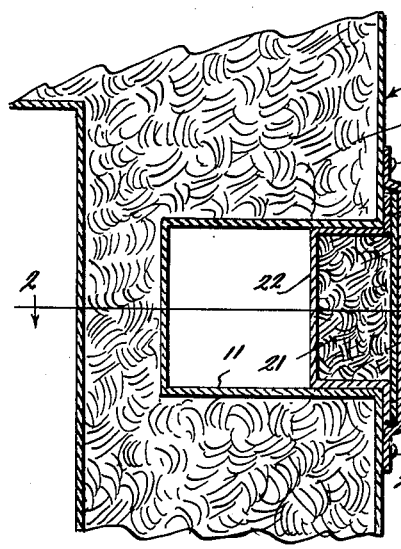
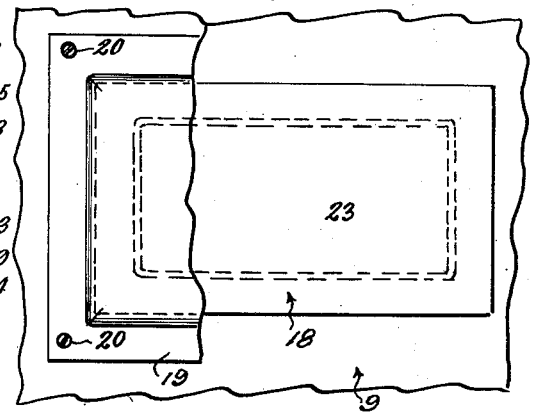
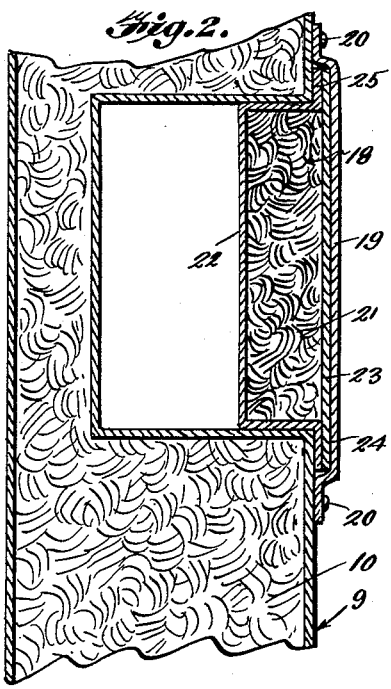
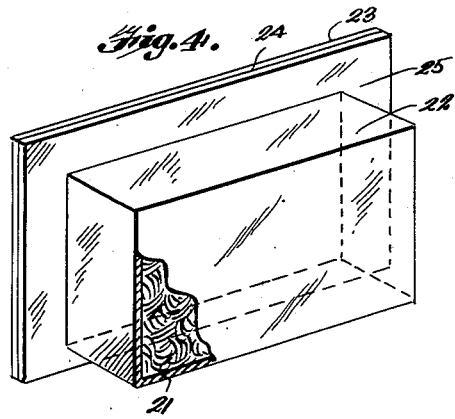
Inventor
CARL H. RIPATTE
By *Patrick D. Beavers*
Attorney Nov. 7, 1950          C. H. RIPATTE          2,529,187
CAVITY INSULATOR
Filed March 3, 1949          2 Sheets-Sheet 2
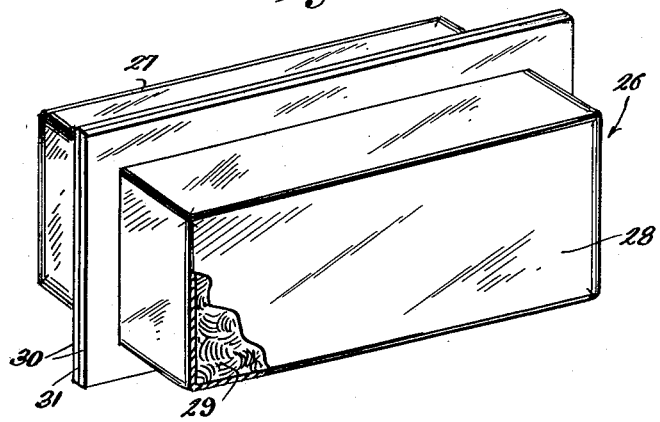
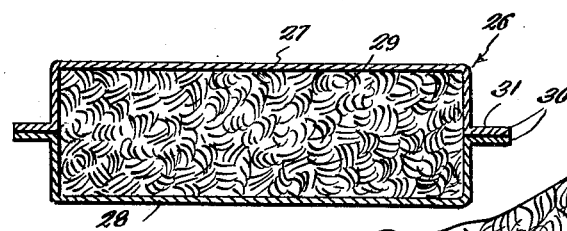
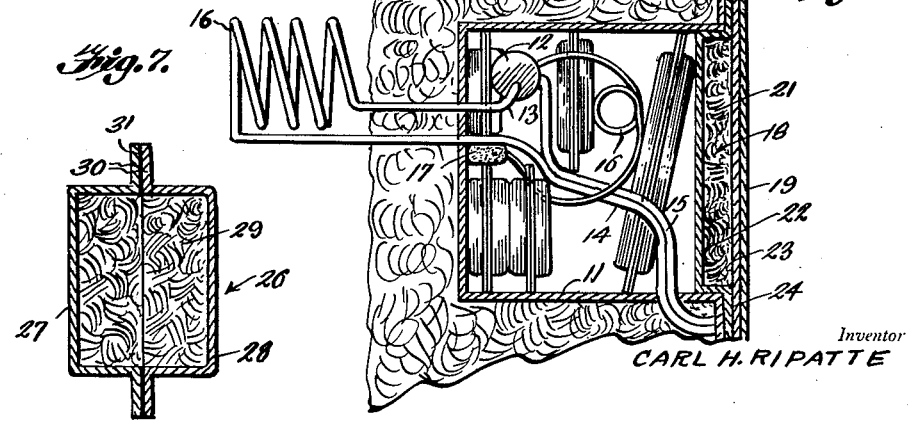
Inventor
CARL H. RIPATTE
By Patrick D. Beavers
Attorney Patented Nov. 7, 1950

2,529,187

UNITED STATES PATENT OFFICE 2,529,187

CAVITY INSULATOR

Carl H. Ripatte, Oxnard, Calif.

Application March 3, 1949, Serial No. 79,407

4 Claims. (Cl. 62—89)

This invention relates generally to improvements in insulation materials and devices employed in refrigerating equipment and more particularly to new and improved cavity insulators, which are particularly well suited for use in expansion valve cavities such as are found, for example, on ice cream cabinets.

Heretofore it has been the customary practice to place loose insulation in the expansion valve cavities. This arrangement of the insulation however, has not been found to be entirely satisfactory in service for the reason that there is no provision for preventing moisture from collecting in the cavity, with the result that the insulation becomes soaked and frequently frozen within the cavity, thereby greatly reducing its insulation valve, impairing the normal effective operation of the expansion valve, and rendering the task of the service man, in adjusting or replacing the valve, difficult to perform.

The foregoing difficulties of the prior art arrangement are obviated by the cavity insulators of the present invention, which are constructed and arranged in the form of insulation filled, moisture proof sacks or bags effective to seal the cavity against admission of moisture thereinto, while also being capable of fully filling the free space within the cavity around and about the tubing, expansion valve, and sensitive bulb therefor. This arrangement has the advantage of promoting a highly effective expansion valve operation, while also preventing freezing of the insulation to the tubing and to other parts of the refrigerator equipment in the cavity, thus facilitating its ready removal and replacement during servicing of the refrigerating equipment. Moreover, the arrangement has the further advantage of making possible re-use of the same insulators, as they need not be damaged, or the effective operation thereof impaired, upon removal from the cavity.

It is an object of the present invention therefore to provide a cavity insulator which is effective in moisture-sealing the cavity.

Another object is to provide a cavity insulator which promotes increased efficiency of operation of the expansion valve disposed within the cavity.

A further object is to provide a cavity insulator which facilitates the ready removal and replacement of the insulation from the cavity, during servicing of the refrigerating equipment disposed therein.

A still further object is to provide a cavity insulator which may be re-used effectively within the cavity, after having once been removed therefrom following a period of service of the refrigerating equipment.

An additional object resides in the provision of a new and improved arrangement of insulation filled, moisture-proof containers within an expansion valve cavity, effective to prevent collecting of moisture therein and effective to increase the efficiency of operation of the expansion valve.

Still other objects, features and advantages of the present invention reside in the novel construction, combination and arrangement of parts disclosed in the following specification with reference to the accompanying drawings wherein:

Figure 1 is a sectional view taken through an expansion valve chamber and illustrating the manner in which the chamber is sealed by the cavity sealer insulator and cover plate of the present invention.

Figure 2 is a sectional view taken along the line 2—2 of Figure 1.

Figure 3 is a front elevational view of the cavity sealer insulator and cover plate, the latter being partially broken away to show the arrangement of parts.

Figure 4 is a view in perspective of the cavity sealer insulator.

Figure 5 is a view in perspective of the cavity insulator employed within the valve chamber, around and about the refrigerating parts disposed therein.

Figures 6 and 7 are sectional views, taken longitudinally and transversely respectively, of the cavity insulator of Figure 5, and Figure 8 is a sectional view similar to that of Figure 1 and illustrating the refrigerating components disposed within the cavity and in communication therewith.

Referring now to the drawings for a more complete understanding of the invention, and more particularly to Figure 8 thereof, there is shown thereon a fragmentary portion of a refrigerating unit, which for purposes of description may be regarded as an ice cream cabinet, generally designated 9, and having the usual insulation 10 and the cavity 11 which forms the chamber for the expansion valve 12. The expansion valve 12 communicates as by tubing 13, 14 and 15 with the cooling coil 16 and with the usual suction and liquid sources, not shown.

The expansion valve 12 also communicates as by the capillary tube 16 with the usual sensitive bulb 17 also disposed within the cavity 11. In like manner, in many refrigerator installations the cavity may have located therewithin another bulb, not shown, for thermostatic control.

According to the arrangement of the present invention, the cavity 11 preferably is sealed by the cavity sealer insulator generally designated 18 and the dish-shaped cover plate 19 therefor, the flange portion of the latter being secured to the cabinet 9 in any suitable manner as by the screws or the like fastening means 10.

The cavity sealer insulator 18 comprises a quantity of insulation material 21, which may be of any type suitable for the purpose such, for example, as dry Kapok. The insulation material is enclosed by a sack comprising a one piece chamber forming sack member 22 and a one piece top or cover forming sack member 23, the two sack members 22 and 23 being formed of a suitable material such, for example, as number 4 or 6 guage Vinylite plastic film, which remains moisture-proof and pliable under freezing and thawing conditions, and which may be heat or resin sealed as at 24 to form a moisture proof seal therebetween.

The sealed flange portion 25 of sack member 22 and the peripheral edge portion of cover member 23 serve as a gasket under the upset or dished portion of the cover plate 19, whereby a moisture-proof seal is established between the mouth of cavity 11 and sealer insulator 18 when screws 20 are tightened.

The remaining space within the expansion valve chamber preferably is filled with cavity insulators having the general configuration of the sack type insulator generally designated 26. This insulator is formed of two identical chamber forming sack members 27 and 28 which are generally similar to sack member 22 of sealer insulator 18 and similarly serve to enclose a quantity of dry Kapok or like insulation material 29.

Sack members 27 and 28 also preferably are formed of Vinylite plastic film or the like whereby their flanged portions 30 may be heat or resin sealed to form a moisture-proof seal as 31.

Sack members 27 and 28, however, preferably are formed of somewhat more pliable material, thereby to form a somewhat looser insulation sack than sealer insulator 18, whereby the sack insulators 26 may be packed around and about the tubing and other refrigerator components disposed within the cavity, until the same is filled, the insulators to this end being placed in various positions as illustrated in Figure 8.

It will be understood further that the insulators 26 may be manufactured in different sizes and shapes to facilitate filling the free space within the valve chamber.

From the foregoing it should now be apparent that cavity insulators and arrangements therefor within the valve cavities have been provided, which are well adapted to fulfill the aforestated objects of the invention and, whereas specific constructions and applications of the insulators have been disclosed in particularity for the purposes of illustration, it will be understood by those skilled in the art that various changes in construction and arrangement of parts may be resorted to without departing from the spirit and scope of the invention as defined by the appended claims.

What I claim as my invention is:

1. The combination with a refrigerator cabinet having a cavity and refrigerating components and tubing therefor disposed within the cavity, of a moisture proof and pliable sack having a quantity of insulation material contained therein and a flange like peripheral portion, means including a dish-shaped cover plate for securing peripheral portion of the sack to the cabinet in moisture sealing relation with respect to the mouth of said cavity therein, and a plurality of insulation filled moisture-proof and pliable sacks disposed around and about said components and tubing and filling the free space within the cavity.

2. In combination with a refrigerator cabinet having a cavity and refrigerating components and tubing therefor disposed within the cavity, means including an insulation filled, moisture-proof and pliable sack for sealing the mouth of said cavity, and a plurality of insulation filled, moisture-proof and pliable sacks arranged around and about said tubing and components to fill the free space within the cavity.

3. The combination of a refrigerator cabinet having a cavity therein, refrigerating components and tubing therefor arranged within said cavity, a two piece pliable plastic sack having a quantity of insulation material contained therein and each of the two pieces thereof having matching peripheral portions, said peripheral portions being sealed together to form a gasket portion and a moisture-proof joint therebetween, means including a cover plate for securing said gasket portion to the cabinet in moisture sealing relation with respect to the mouth of said cavity therein, and a plurality of pliable plastic sack insulators arranged within said cavity around and about said components and tubing to fill the free space within the cavity, each of said plurality of sack insulators having a quantity of insulation material contained therein and comprising a two piece sack having matching peripheral portions sealed together to form a moisture proof joint therebetween.

4. In a refrigerator cabinet having a cavity therein and refrigerating components and tubing therefor arranged within the cavity, the combination of a plurality of insulation filled, moisture proof and pliable plastic sacks arranged within the cavity to fill the free space therewithin, and means including one of said plurality of sacks for forming a moisture proof closure for the mouth of the cavity.

CARL H. RIPATTE.

REFERENCES CITED

The following references are of record in the file of this patent:

UNITED STATES PATENTS

| Number | Name | Date |
|---|---|---|
| 1,505,845 | Banta | Aug. 19, 1924 |
| 2,052,407 | King | Aug. 25, 1936 |
| 2,245,611 | Schultz | June 17, 1941 |
| 2,280,202 | Tobey | Apr. 21, 1942 |